United States Patent [19]

Haviland, deceased et al.

[11] 4,049,193
[45] Sept. 20, 1977

[54] SYSTEMS AND APPARATUS FOR CONTROL OF FUELED HEAT GENERATORS

[75] Inventors: Herbert Haviland, deceased, late of Norfolk, Conn.; by Diane Haviland, administratrix, Stratford, Conn.; Arthur Smith, Ansonia, Conn.; Charles Boyer, Bronx, N.Y.

[73] Assignee: Fuel Computer Corporation, Bronx, N.Y.

[21] Appl. No.: 601,442

[22] Filed: Aug. 4, 1975

[51] Int. Cl.² ............................................. F23N 5/20
[52] U.S. Cl. .................. 236/46 R; 219/492; 307/141.4; 236/47
[58] Field of Search ............. 236/46 R, 47; 219/492; 307/141.4; 337/302, 304; 317/DIG. 1; 165/12

[56] References Cited

U.S. PATENT DOCUMENTS 3,917,165 11/1975 Cross .................................. 236/46 R Primary Examiner—William E. Wayner
Attorney, Agent, or Firm—Watson, Leavenworth, Kelton & Taggart

[57] ABSTRACT

Apparatus for use in controlling the firing of heat generators provides output signals having first or second different characteristics during preselected time periods, the times of occurrence and extents of which are readily changeable by variation of the settings of switches. A system includes night and day thermostats selectively connected with a heat generator under control of such apparatus.

14 Claims, 12 Drawing Figures

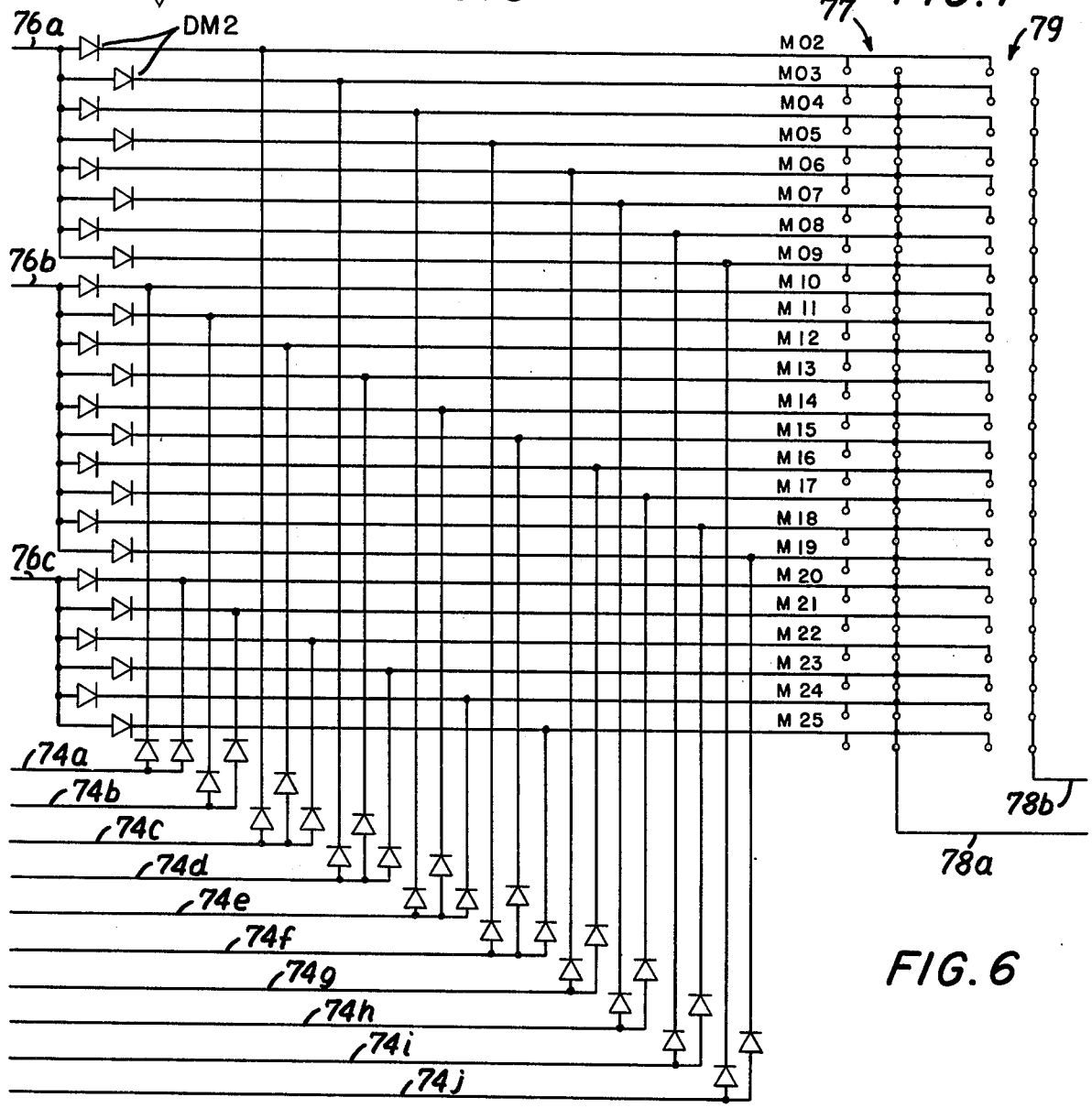

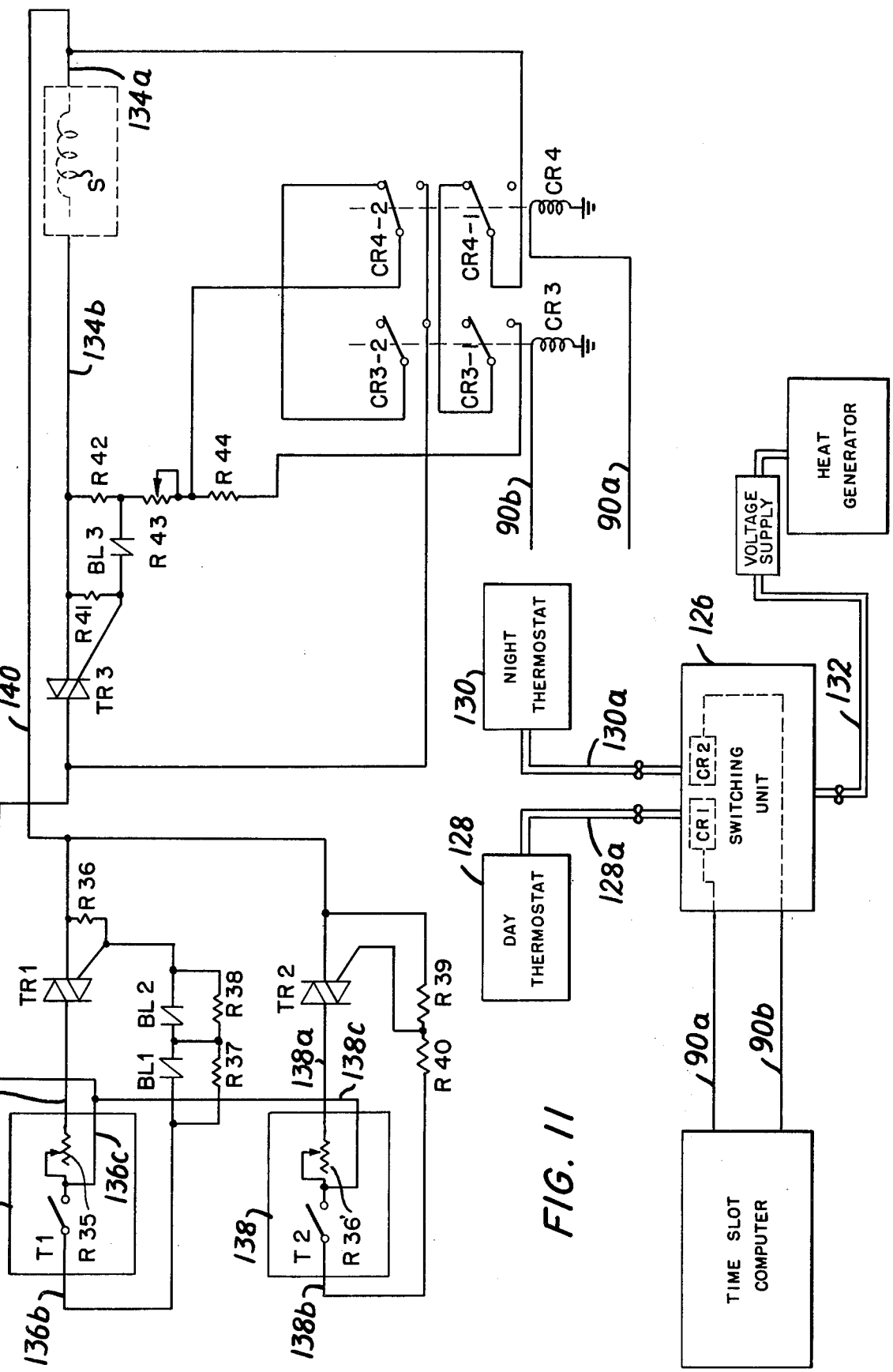

SYSTEMS AND APPARATUS FOR CONTROL OF FUELED HEAT GENERATORS

FIELD OF THE INVENTION

This invention relates to apparatus and systems for use in the heating and air conditioning of residences and industrial facilities and more particularly to improved apparatus and systems for imposing limits on fuel comsumption while maintaining desired comfort levels.

BACKGROUND OF THE INVENTION

In copending commonly-assigned U.S. patent application Ser. No. 447,666, now U.S. Pat. No. 3,949,936 filed on Mar. 4, 1974, apparatus and systems are disclosed for imposing time limits on the firing of steam boilers for residences and the like wherein fuel consumption is limited to specified periods by connection of a power supply to a boiler firing device through a series circuit having a time-controlled switch arrangement selectively closed by electromechanical clock mechanisms and a switch having state responsive to boiler steam heat content. In their specified usage, such previously known apparatus and system are directed to steam environments and employ, as their switch responsive to boiler steam heat content, such as the customary steam pressure-sensitive switch closeable at a first stream pressure level and thereafter not openable until a second higher steam pressure level is reached. In their direction, such known apparatus and system provide that boiler firing shall occur only where both the time-controlled and steam pressure responsive switches are closed, i.e., during only time-selected portions of periods when the boiler firing devices would otherwise be energized.

Other diverse types of heating control systems employing time intervention in the customary direct control of a heat generator by an area heat sensor are set forth in U.S. Pat. No. 2,175,945 to Simpson and U.S. Pat. No. 2,162,116 to Peltz. In the heat control system of the Simpson patent, a power supply is connected to a heat generator through a series circuit comprising a room thermostat and a time-controlled switch. The time-controlled switch is in the form of an electromechanical commutator, segments of which periodically engage a fixed brush member to complete the energizing circuit for the heat generator. The commutator segments are of fixed angular extent and of fixed disposition relative to one another whereby the periodicity of connect-disconnect cycles is uniform. Further, the commutator shaft is driven at a constant speed preselected in accordance with outdoor temperature and values calibrated from steam radiator and like system components. The system involved in the Peltz patent operates to introduce a fixed delay in reporting thermostat demands to the heat generator. Thus, on the generation of a heat demand by the thermostat, a time delay mechanism is energized and, after the time-out thereof expires, a normally-open switch is closed conveying the heating demand to such as a stoker motor. As in the case of the Simpson patent, the time intervening mechanism is electromechanical and of fixed time-defining nature.

Of the three varieties of prior art systems above-discussed, only that of the referenced copending application provides for ready variation of the periods of time intervention in heating control systems. The latter two systems are evidently limited by reason of their lack of such time varying facility and the system of the referenced copending application has disadvantage by reason of its electromechanical structure and its specified applicability only to steam related systems and steam heat content measuring requirement.

SUMMARY OF THE INVENTION

An object of the present invention is to provide improved systems and apparatus for use in controlling heat generators.

A more particular object of the invention is to provide improved readily variable time intervention apparatus for heating control systems.

In attaining the foregoing and other objects, the invention provides what might be termed a "time-slot" computer providing output signals having first or second different characteristics during preselected time periods, the extents of which are readily changeable by variation in the settings of switches in the system. In its preferred form, the system employs first circuitry including a digital clock, for generating output signals indicative of elapsed time of day. Second circuitry generates successive first and second output signals when the first circuitry output signals indicate different elapsed times of day. Operator-controllable switches provide for selective setting of such first and second different elapsed times of day. Third circuitry of the system generates an output signal which is of alternating first and second character during a preselected time period commencing on the occurrence of the second circuitry second output signal. Operator-controllable switches are settable to change the respective extents of time during which the third circuitry output signal is of first character and second character. Fourth circuitry of the system generates a system output signal having a first characteristic upon occurrence of the second circuitry first output signal and continuously thereafter until occurrence of the second output signal of such second circuitry and further continuously during periods in which the third circuitry output signal is of first character. The fourth circuitry provides further that the system output signal have a second characteristic continuously during periods in which the third circuitry output signal is of second character.

As is discussed in detail hereinafter, such first elapsed time of day may be an early morning hour at which it may be desired to shift control of a heat generator from a night thermostat to a day thermostat. In providing a system output signal of first character commencing at such early morning hour and extending through to a later morning hour, such thermostat changeover may be accomplished and the day thermostat may control the heat generator without time-dependent interruption. The second elapsed time of day may be such later morning hour at which time it is desired to impose predetermined time-dependent interruption of the day thermostat control of the heat generator. To this end, the system of the invention maintains its output signal of such first character only during prescribed portions of the time period commencing at such later morning hour.

In a further aspect, the system of the invention extends the last-mentioned time period through to the occurrence of a further elapsed time of day at which it may be desired to return control of the heat generator to the night thermostat and to maintain that condition until recurrence of the referenced early morning hour. To this end, the system maintains its output signal of second character during the night thermostat control period and selectively during the period extending from the later morning hour to commencement of the night thermostat control.

In a still further aspect, the invention provides so-called "cable saver" system and apparatus for conveying time-controlled signals to a heat generator from day and night thermostats over a two-wire cable, permitting day-night system installation without need for revision to the wiring arrangement for a pre-existing day thermostat.

The foregoing and other objects and features of the invention will be evident from the following detailed description of preferred embodiments of the system and apparatus of the invention and from the drawings thereof wherein like reference numerals identify like parts throughout.

DESCRIPTION OF THE DRAWINGS

FIG. 4 is an electrical schematic diagram of mode-ten minutes generator 40 of FIG. 1.

FIG. 5 is an electrical schematic diagram of driver 48a of FIG. 1.

FIG. 6 is an electrical schematic diagram of cycle period generator 78 of FIG. 1.

FIG. 7 is an electrical schematic diagram of driver 80 of FIG. 1.

FIG. 8 is an electrical schematic diagram of driver 86 of FIG. 1.

FIG. 11 illustrates a heating control system employing the time slot system of FIG. 1.

FIG. 12 is a schematic diagram of cable saver apparatus in combination with day-night thermostats.

DESCRIPTION OF THE PREFERRED EMBODIMENTS

Figure 1:
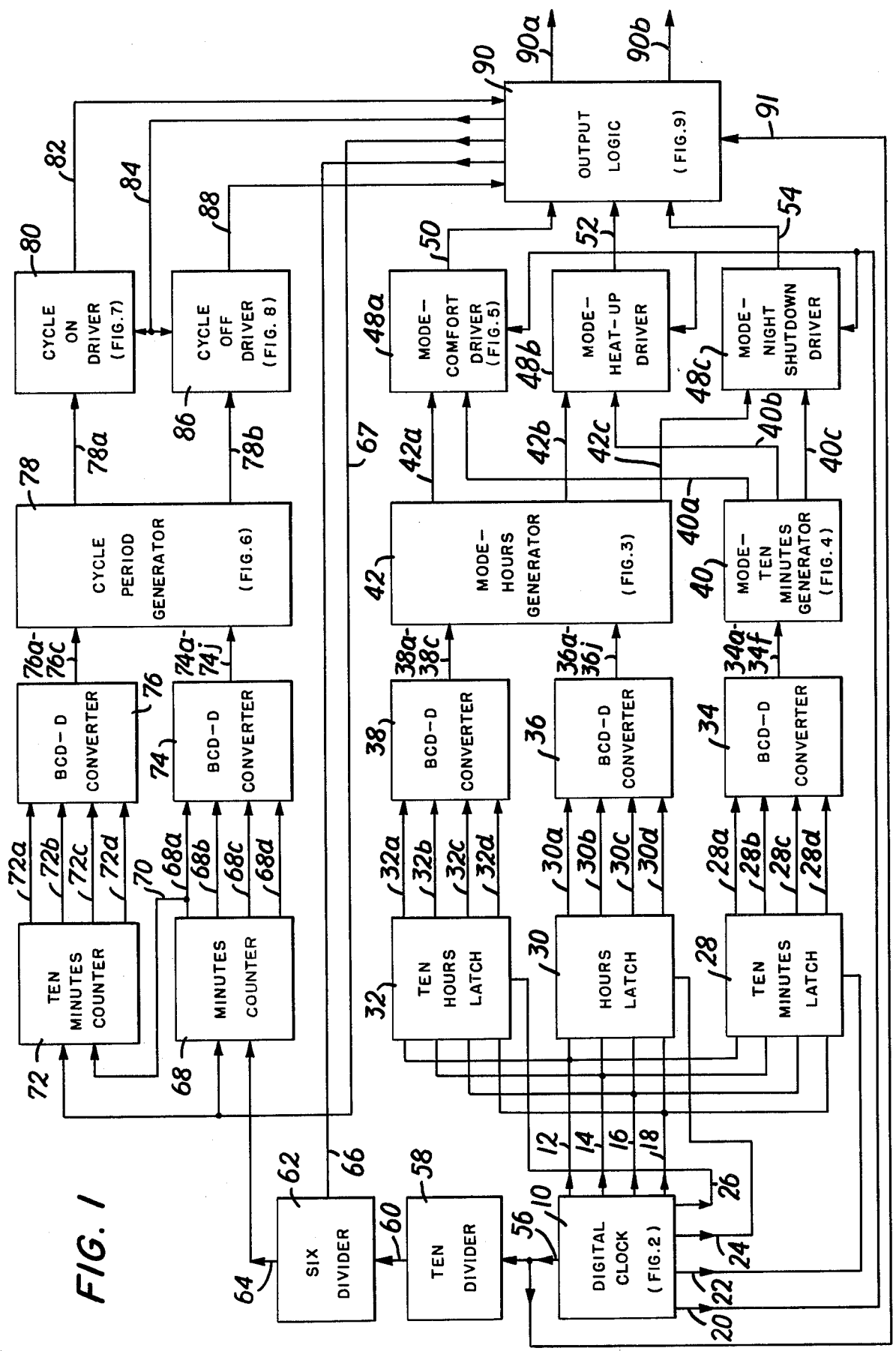
FIG. 1 is a block diagram of a time-slot system in accordance with the invention.

Referring to FIG. 1, the time-slot system therein includes a digital clock 10, circuitry for which is discussed in detail below in connection with FIG. 2. Clock 10 generates on output lines 12, 14, 16 and 18 binary-coded-decimal (BCD) signals indicative of elapsed time of day. Signals applied to these lines are multiplexed in sets separately indicative of tens of hours, hours, and tens of minutes. Clock 10 further generates digital enable signals on lines 20, 22, 24 and 26. The signals on lines 22, 24 and 26 are time-correlated with the line 12–18 signals such that, on line 22 HI (ONE, e.g., + 5 volts) the line 12–18 signals are then indicative of tens of minutes. Similarly, when lines 24 and 26 are successively HI, the line 12–18 signals are then respectively indicative of hours and tens of hours.

Lines 12–18 are applied in parallel to latching circuits 28, 30 and 32. These circuits are gated respectively by the signals on lines 22, 24 and 26 and serve to retain the signals existing on lines 12–18 at the time of gating. Latch circuits suitable for such use may comprise commercially-available integrated circuits (ICs) SN7475N, manufactured by National Semiconductor. BCD-D (binary-coded-decimal to decimal) converters 34, 36 and 38 may comprise commercially-available ICs SN7442N, manufactured by National Semiconductor.

In the case of converter 34, the first six decimal line outputs thereof are applied over lines 34a–34f to mode-10 minutes generator 40, preferred circuitry for which is considered in connection with FIG. 4 below. In the case of converter 38, the first three decimal line outputs thereof are applied over lines 38a–38c to mode-hours generator 42. The entire ten decimal line outputs of converter 36 are applied over lines 36a–36j to generator 42. Preferred circuitry for generator 42 is considered below in connection with FIG. 3. Generator 40 provides its output on lines 40a, 40b and 40c. Generator 42 provides its output on lines 42a, 42b and 42c.

Figure 3:
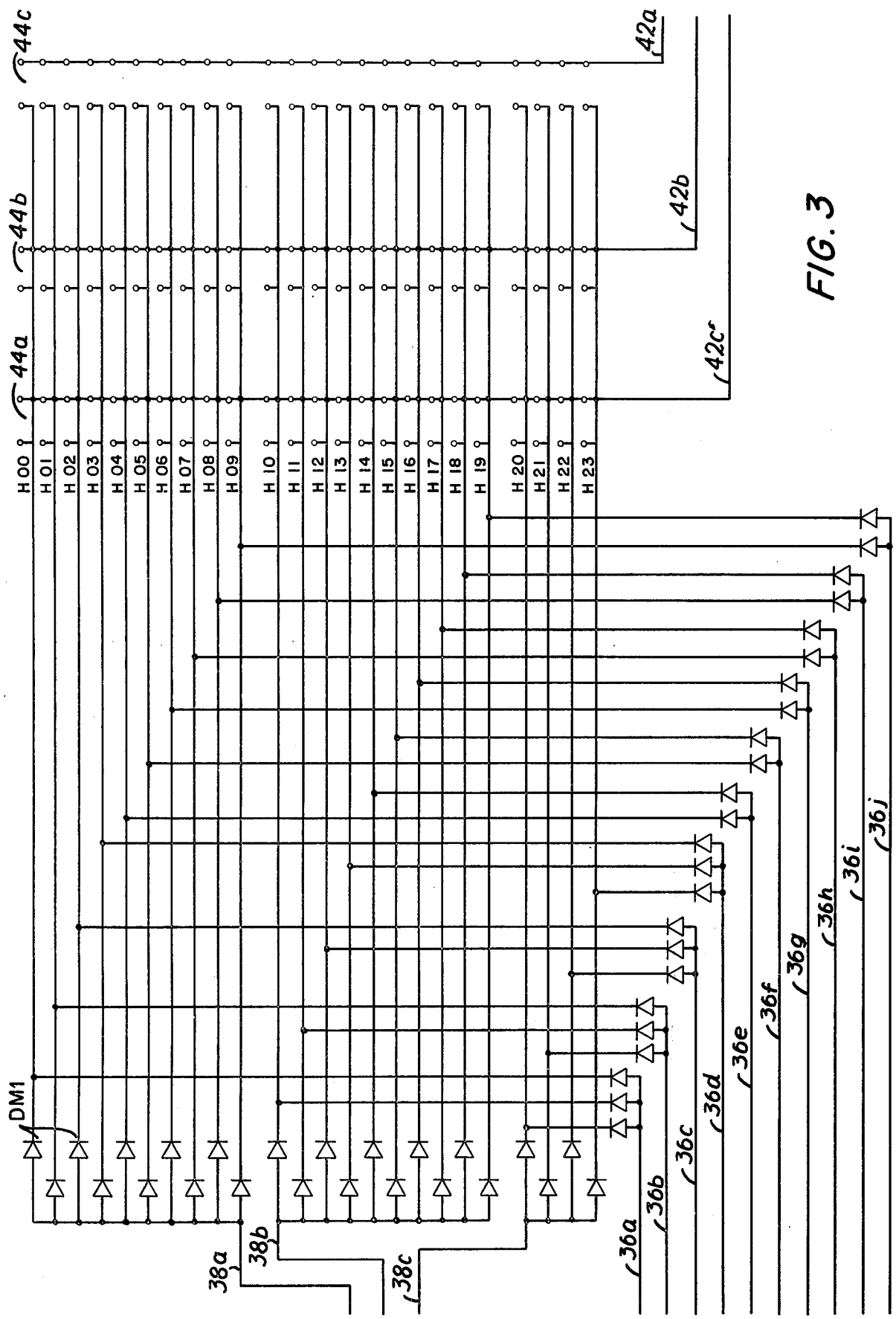
FIG. 3 is an electrical schematic diagram of mode-hours generator 42 of FIG. 1.

Referring now to FIG. 3, the system at hand may define three modes of operation in its arrangement of switch sets 44a, 44b and 44c interconnected through diode-matrix DM1 with lines 38a–38c and lines 36a–36j. Twenty-four individual switches are embodied in each of switch sets 44a–44c, indicative of the individual hours in a day. First terminals of corresponding of such individual switches are connected in common to an individual one of the diode-matrix lines H00–H23. For instance, first terminals of the vertically uppermost individual switches in the respective switch sets are connected to diode-matrix line H00. H00 indicates the hour of the day between midnight and 1 AM and line H00 is selectively LO (at or near 0 V. potential-ground) when lines 38a and 36a are LO. Line H13, indicating the hour between 1 PM and 2 PM is selectively LO when lines 38b and 36d are LO. All second terminals of the individual switches in switch set 44a are connected to line 42c. All second terminals of the individual switches in switch set 44b are connected to line 42b. All second terminals of the individual switches in switch set 44c are connected to line 42a.

In assignment of such three modes, one mode is time-initiated by switch set 44a and may identify an hour of the day which begins a period in which heat generator control is to be subject to a night thermostat without time-related interruption. Another mode is time-initiated by switch set 44b, and may identify an hour which begins a period in which heat generator control is to be subject to a day thermostat without time-related interruption, such mode time being successive to and discontinuing the first-mentioned mode. A further mode is time-initiated by switch set 44c and may identify an hour at which predetermined scheduling of day thermostat control is to occur. By way of example, in application of the system, the terminals of the individual switch of set 44a in line H22 may be connected together, as by a suitable disconnectable jumper, thereby establishing a "night shutdown" period commencing at 11 PM. A disconnectable jumper may likewise be connected across the terminals of the switch of switch set 44b in the line H05 for establishing a "heat-up" period commencing at 5 AM. A further disconnectable jumper may be connectable across the terminals of the individual switch in switch set 44c in line H07 such that a "comfort" period may commence at 7 AM following such 2 hour continuous heating period and be maintainable until night shutdown should again commence. LO states of lines 42a, 42b and 42c will signal the respective hours of commencement of the foregoing three modes.

Referring now to FIG. 4 generator 40 includes switch sets 46a, 46b and 46c, individual switches of which have first terminals connected as indicated to lines 34a–34f, also labeled TM (10 minutes)00–TM50. The second terminals of the individual switches of switch set 46a are connected to common line 40c. Second terminals of the individual switches of switch sets 46b and 46c are connected respectively in common to lines 40b and 40a. By way of example of operation of generator 40, if a disconnectable jumper is connected across the terminals of the switch set of 46b in line TM30, line 40b will go LO selectively at the 30th minute of each hour.

Combination of the signals issuing from generator 40 and generator 42 is made selectively in drivers 48a, 48b and 48c responsively to the enable signal generated per minute by clock 10 on line 20, connected in common to drivers 48a–48c. The drivers provide output signals respectively on lines 50, 52 and 54.

Preferred circuitry for driver 48a is shown in FIG. 5 wherein transistor Q1 has its collector connected through resistor R1 to + 5 volts and capacitor C1 connected across its collector and grounded emitter. The transistor base is connected through resistor R2 to line 42a, through resistor R3 to line 40a and through resistor R4 to line 20. The base is further connected through resistor R5 to ground. With circuit parameters and components as indicated hereinafter in Table 1, transistor Q1 is rendered non-conductive, providing substantially + 5 V. level voltage on its collector, and hence on line 50, on simultaneous LO signals on lines 20, 40a and 42a. This condition will be seen to exist during the hour defined by the jumped switch of switch set 44c (FIG. 3) and specifically on the occurrence of the initial line 20 enable signal occurring during the 10 minute period of such hour defined by the jumped switch of switch set 46c (FIG. 4). The FIG. 5 circuitry may also be employed for drivers 48b and 48c. Line 52 will accordingly be driven HI by driver 48b only upon simultaneous occurrence of LO signals on lines 20, 40b and 42b, as related to the jumped switches of switch sets 44b and 46b. Line 54 will be driven HI by driver 48c only upon simultaneous occurrence of LO signals on lines 20, 40c and 42c, as related to the jumped switches of switch sets 44a and 46a.

Prior to discussion of the circuitry for further processing the signals of lines 50–54, the portion of the FIG. 1 system extending upwardly and rightwardly of clock 10 will be considered. Clock 10 generates on line 56 a signal going HI at a frequency of once per second. Divider 58 receives the line 56 signal and provides on line 60 a signal going HI at one-tenth the rate of the line 56 signal. Divider 62 receives the line 60 signal and applies to line 64 a signal going HI at one-sixth the rate of the line 60 signal, i.e., going HI at the rate of once per minute. Divider 58 may be comprised of IC SN7490N, manufactured by National Semiconductor. Divider 62 may be comprised of IC SN7492N, manufactured by National Semiconductor.

Counter 68 counts line 64 signals and provides output BCD indication of its minutes count on lines 68a–68d. Line 70 interconnects line 68a and counter 72 which provides output BCD indication of the cycling of counter 68 through 10 counts (10 minutes count) on its output lines 72a–72d. Counter 68 may comprise IC SN7409N, manufactured by National Semiconductor. Counter 68 is cleared by signals on line 67. Counter 72 may be the same IC as counter 68.

Lines 68a–68d are connected to converter 74 which provides output decimal indication on lines 74a–74j of minutes elapsed from each clearing of counter 60. Converter 76 is connected to lines 72a–72d and provides output decimal indication on lines 76a–76c of tens of minutes elapsed from each clearing of counter 72. Both converters 74 and 76 may comprise IC SN7442N, manufactured by National Semiconductor.

Cycle period generator 78 is preferably of circuit structure illustrated in FIG. 6, comprising a diode-matrix DM2 interconnecting lines 76a–76c and lines 74a–74j and switch sets 77 and 79. First terminals of corresponding individual switches in the respective switch sets are connected as indicated to lines M(minutes)02–M25. Second terminals of the individual switches of switch set 77 are connected in common to line 78a and second terminals of the individual switches of each switch 79 are connected in common to line 78b.

On clearing of counters 68 and 72 on state change of line 67, line 78a (cycle ON) goes HI upon subsequent count correlated with the jumped individual switch of switch set 77. For instance, if a jumper is applied to the switch in line M06 of FIG. 6, line 78a exhibits state change upon six minutes count, i.e., when lines 76a and 74f are together LO. On this event, counters 68 and 72 are again cleared and counting from zero recurs. Assuming that the switch of switch set 79 in line M15 is also jumped, line 78b will go LO upon subsequent fifteen minutes count, i.e., when lines 76b and 74e together are LO.

Line 78a is connected to cycle ON driver 80, preferred circuitry for which is shown in FIG. 7. Driver 80 is rendered operative to control line 82 in accordance with the state of line 84 which is in turn controlled as discussed hereinafter. Referring to fig. 7, line 78a is connected to the base of transistor Q2 through resistor R6 and the transistor collector is connected directly to line 82 and to + 5 volts through resistor R7. The base is further connected through resistor R8 to ground and through a diode to line 84. The emitter of Q2 is grounded and capacitor C2 is connected across the emitter and collector. Where line 84 is HI the base of Q2 follows line 78a signals whereby Q2 is rendered conductive by line 78a HI signals with line 82 thereby being rendered LO. Conversely, when line 78a is LO or when line 84 is LO, Q2 is non-conductive and line 82 is provided with a HI signal.

Line 78b is connected to cycle OFF driver 86, preferred circuitry for which is shown in FIG. 8. Driver 86 is rendered operative to control line 88 in accordance also with the state of line 84. Referring to FIG. 8, line 78b is connected to the base of transistor Q3 through resistor R9 and the collector of Q3 is connected directly to line 88 and to + 5 volts through resistor R10. The base of Q3 is further connected to ground through resistor R11 and the emitter is grounded. Capacitor C3 is connected across the collector and emitter of Q3. Line 88 is connected through a diode to line 84. The base of Q3 follows line 78b signals whereby Q3 is rendered conductive by line 78b HI signals and is non-conductive when line 78b is LO. Line 88 is LO when Q3 is conductive and is HI when Q3 is non-conductive. When line 84 is LO, line 88 is thereby maintained LO irrespective of change in state of line 78b.

Referring again to FIG. 1, output logic circuit 90 will be seen to receive mode-indicative signals on line 50 (HI for comfort), on line 52 (HI for heat-up) and on line 54 (HI for night shutdown), cycle period-indicative signals on line 82 (HI for cycle on) and on line 88 (HI for cycle off) and a clock pulse at one per second rate on line 91. Logic 90 furnishes control signals on line 67 for clearing counters 68 and 72, on line 66 for setting divider 62 and on line 84 for enabling or disabling drivers 80 and 86. Logic 90 provides its output signals on lines 90a and 90b.

In its overall function, logic 90 sets line 90a HI at a first time of day (hour and tens of minutes), e.g., 5 AM, defined by the closed switches of switch sets 44b and 46b and maintains line 90a HI from that time through to a second time of day (hour and tens of minutes), e.g., 7 AM, defined by the closed switches of switch sets 44c and 46c. At such second time of day, a time commences wherein logic 90 maintains line 90a LO for a first time period of minutes defined by the closed switch of switch set 79 and then sets line 90a HI and maintains it HI for a second time period of minutes defined by the closed switch of switch set 77. During such time periods, logic 90 maintains line 90b LO.

Logic 90 cycles line 90a repetitively in the manner described until occurrence of a third time of day (hour and tens of minutes), e.g., 11 PM, defined by the closed switches of switch sets 44a and 46a. At such third time of day, logic 90 sets line 90b HI and line 90a LO and maintains this condition until recurrence of the above-mentioned first time of day whereupon the described procedure repeats in its entirety.

Figure 9:
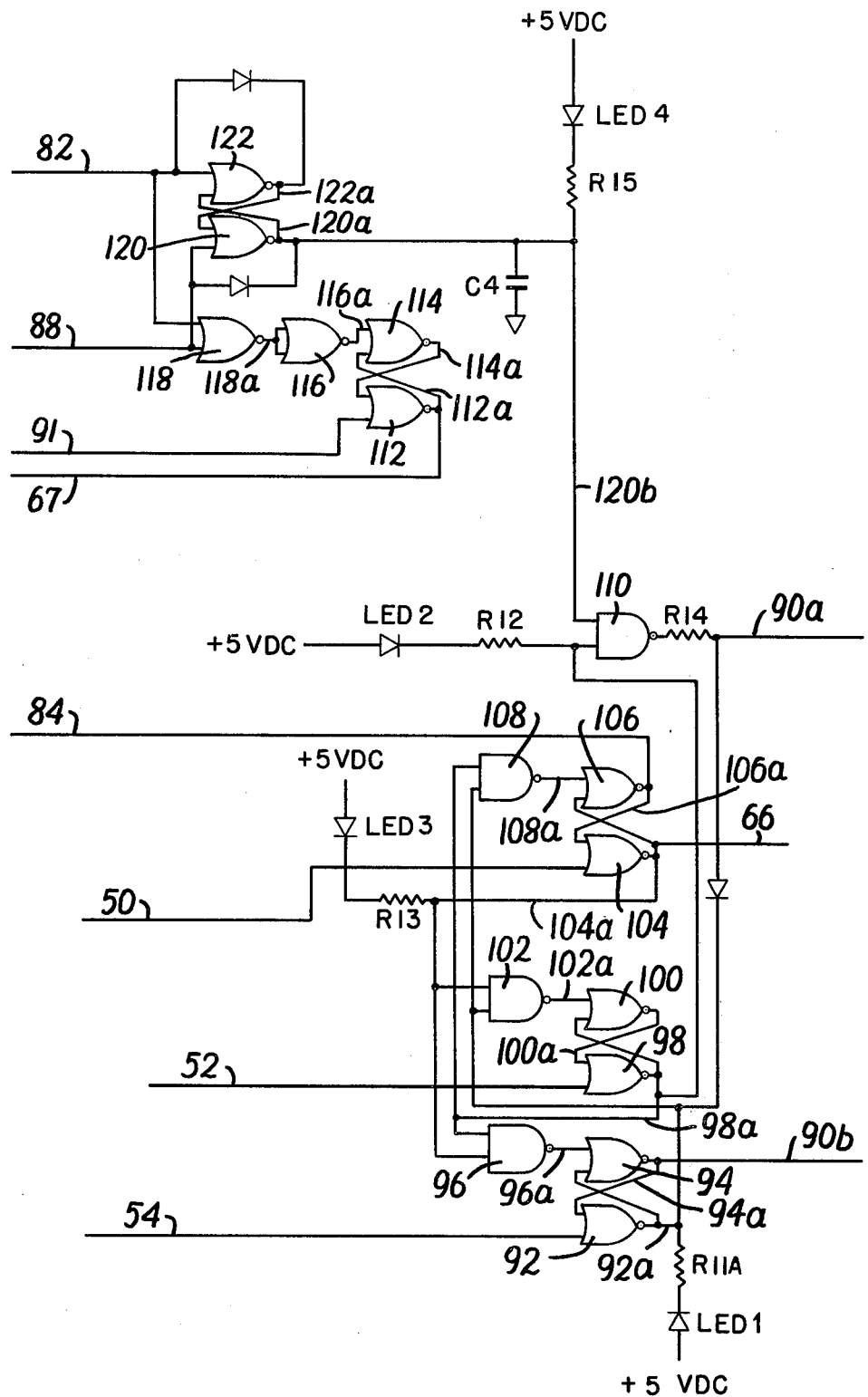
FIG. 9 is a circuit diagram of output logic 90 of FIG. 1.

A preferred embodiment of circuitry for output logic 90 is illustrated in FIG. 9. In large part, such circuitry is constituted by two types of gating circuits. One type of gating circuit, indicated at 92, receives a first input from line 54 and a second input from line 94a. The gate provides its output on line 92a. For this type of gate line 92a is LO at all times other than when lines 54 and 94a are together LO. Under such LO condition of lines 54 and 94a, line 92a goes HI. The other type of gate, indicated at 96, receives inputs from lines 104a and 98a and provides its output on line 96a. For this gate, line 96a is HI at all times other than when lines 98a and 104a are HI. Under such HI condition of lines 98a and 104a, line 96a goes LO.

The line 54 input signal is processed by gate 92, as affected by gates 94 and 96. When line 54 goes HI, gate 92 applies a LO to line 92a with line 92a and line 96a together LO, line 90b is driven HI by gate 94 and line 90a is then LO, being diode-coupled to line 92a. Line 92a is connected through resistor R11A and light-emitting diode LED1 to + 5 volts whereby LED1 may provide output indication of the night shutdown mode.

The line 52 signal is processed by gate 98, as affected by gates 100 and 102. When line 52 goes HI, gate 98 applies a LO to line 98a. When line 98a goes LO, line 90a is driven HI through gate 110. At the same time, line 90b is driven LO through line 98a input to gate 96. Line 98a is further connected through resistor R12 and LED2 to + 5 volts whereby LED2 may provide output indication of the occurrence of the heat-up mode. With line 90b LO and line 54 LO, LED1 is extinguished as a result of a HI condition at 92a.

The line 50 signal is processed by gate 104, as affected directly by gates 106 and 108. When line 50 goes HI, gate 104 drives line 104a LO. With line 104a LO and line 108a LO, gate 106 drives line 84 HI, thereby enabling drivers 80 and 86 (FIGS. 1, 7 and 8) and initiating the comfort mode. Such line 104a LO condition further sets up input conditions at gates 96 and 102 whereby line 90b is maintained LO and line 98a is maintained HI. When line 98a HI, LED2 is extinguished and with line 104a LO, LED3 is energized through resistor R13 to provide output indication of the occurrence of the comfort mode. Likewise, with line 104a LO, line 66 provides a LO to divider 62 (FIG. 1).

The cycle-on and cycle-off signals on lines 82 and 88 are processed by gates 118, 120 and 122 which serve to conform the state of line 120b to such periodicity as was above-discussed in the 6 minute on, 15 minute off example. Line 120b thus goes LO for a 6 minute period and gate 110 provides a HI on line 90a. Line 120b thereafter goes HI for a 15 minute period whereby gate 110, having both inputs thereto HI, drives line 90a LO through resistor R14. During LO condition of line 120b, LED4 is energized through resistor R15 to provide output indication of a cycle ON condition. Capacitor C4 is connected between line 120b and ground.

Figure 10:
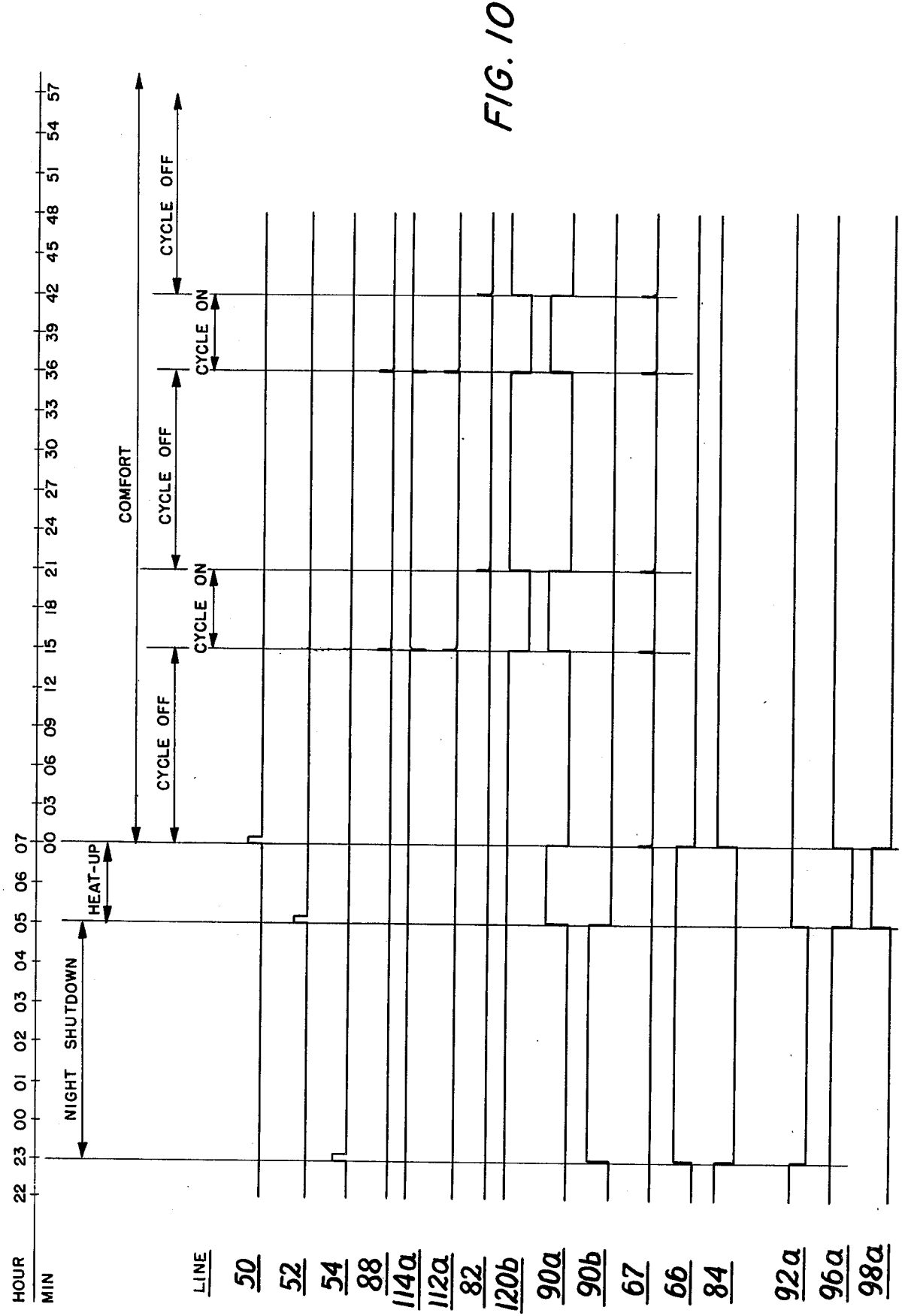
FIG. 10 is a timing diagram illustrating the respective states of lines in the FIG. 9 circuitry during typical operation of the FIG. 1. system.

A more detailed understanding of the operation of the circuitry of FIG. 9 will be had by consideration of the timing activities in the course of the example above-discussed. For this purpose, the timing diagram of FIG. 10 is provided and shows the state of various lines indicated in FIG. 9 with the passage of time.

Figure 2:
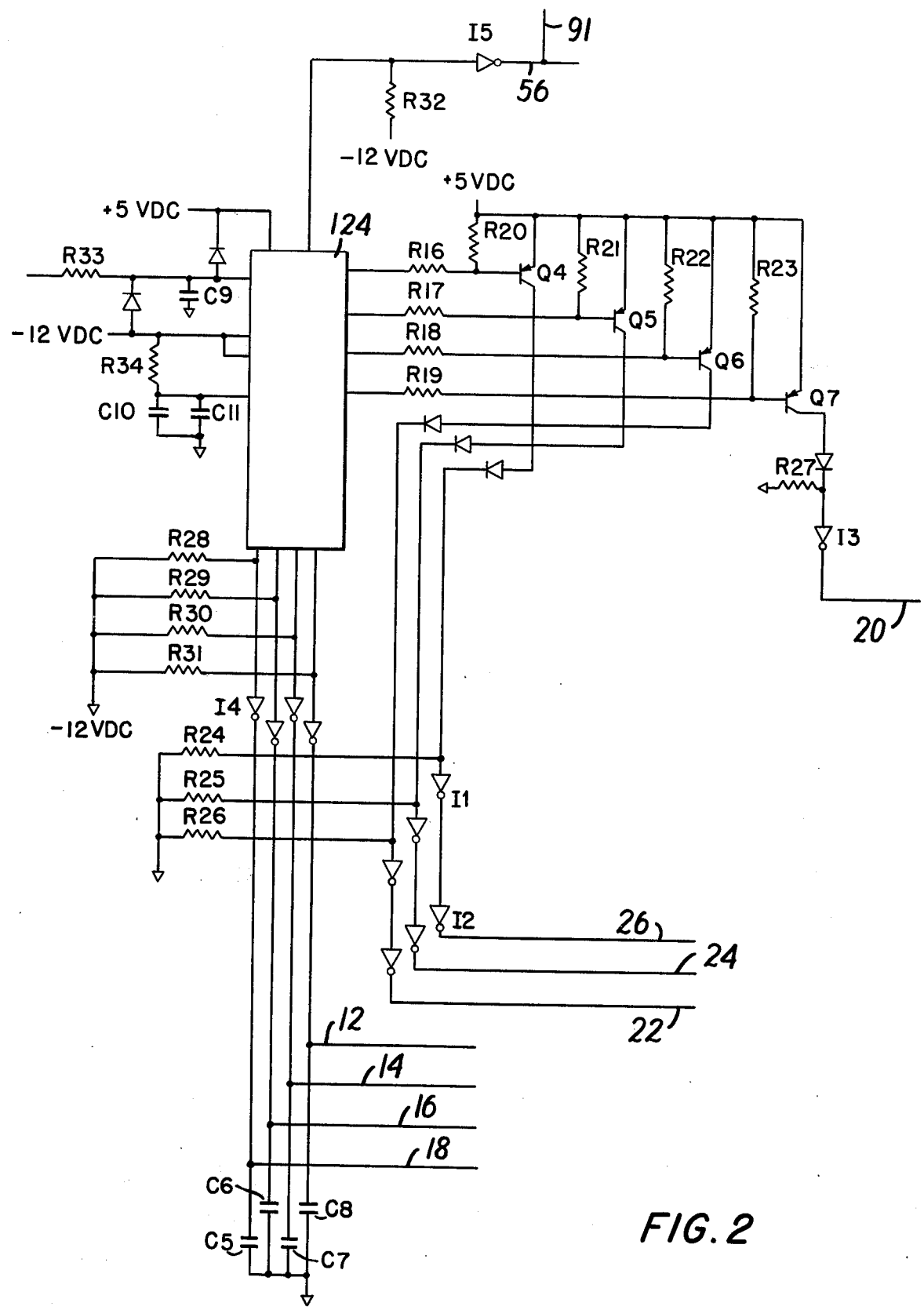
FIG. 2 is an electrical schematic diagram of digital clock 10 of FIG. 1.

A preferred embodiment of digital clock 10 is shown in FIG. 2 wherein unit 124 is a digital clock IC, such as IC MM5312N, manufactured by National Semiconductor and described in detail at pages 10-10 through 10-14 of the catalog *MOS Integrated Circuits*, April 1974. In furnishing the signals on lines 20, 22, 24 and 26, unit 124 provides output signals to resistors R16, R17, R18 and R19 which are connected respectively to the bases of tansistors Q4, Q5, Q6 and Q7. Resistors R20, R21, R22 and R23 connect the bases Q4–Q7 to + 5 volts to which the transistor emitters are directly connected. The collectors of Q4–Q6 are connected through diodes and inverters I1 and I2 to lines 22, 24 and 26. The inputs to inverters I1 are connected to ground through resistors R24, R25 and R26. Transistor Q7 furnishes the line 20 signal by connection of its collector thereto through a diode and inverter I3, the inverter input being connected to ground through resistor R27.

In furnishing the signals on lines 12–18, IC leads are connected through inverters I4 respectively to lines 12–18, with the inverter inputs being connected to − 12 volts through resistors R28, R29, R30 and R31 and the inverter outputs being connected to ground through capacitors C5, C6, C7 and C8.

In furnishing the one pulse per second signal on line 56, IC lead is connected thereto by inverter I5, the inverter input being connected to − 12 volts through resistor R23.

In adapting the time-slot computer discussed to this juncture to use in controlling the firing of a heat generator in an installation of type having pre-existing wiring extending from both day and night thermostats to the heat generator, the system of FIG. 11 may be employed. A switching unit 126 includes relays CR1 and CR2 connected respectively to lines 90a and 90b for energization. The contacts of relay CR1 connect lines 128a, the output wire pair of day thermostat 128, to lines 132 extending to the heat generator. The contacts of relay CR2 connect lines 130a, the output wire pair of night thermostat 130, to lines 132. The heat generator may comprise the customary solenoid in series circuit with the secondary of a transformer whose primary is energized to provide a-c voltage (24 V.) in the secondary.

In situations wherein the pre-existing arrangement is a single thermostat unit with but a single output wire pair, the invention contemplates an arrangement, shown in FIG. 11, whereby a changeover may be made from day to day-night control without the need for opening walls to install a second wire pair.

A pair of lines 134a and 134b are shown extending from solenoid S controlling the heat generator valve. Lines 136a and 136b are connected to day thermostat unit 136, including the customary bi-metallic element T1 and variable resistor R35 with its wiper connected to line 136c. Lines 138a and 138b are connected to night thermostat unit 138, including bi-metallic element T2 and variable resistor R36' with its wiper connected to line 136c. Lines 136a and 138a are connected to first terminals of triacs TR1 and TR2. The gate of TR1 is connected to the second terminal of TR1 by resistor R36 and is further connected through series-connected bilateral switches BL1 and BL2 to line 136b. Resistors R37 and R38 are connected across BL1 and BL2 as indicated. The gate of TR2 is connected to the second terminal of TR2 by resistor R39 and is further connected to line 138b by resistor R40. Line 140 connects the second terminals TR1 and TR2 in common to line 134a.

Lines 136c and 138c are connected in common to the first terminal of triac TR3, the second terminal of which is connected to line 134b. TR3 is fired by circuitry connected to its gate including resistors R41 through R44 and bilateral switch BL3. Such circuitry further depends on the states of energization of relays CR3 and CR4, the coils of which are connected respectively to lines 90b and 90a of the time slot computer above discussed.

The FIG. 12 circuitry energizes solenoid S in accordance with the night thermostat during night shutdown and in accordance with the day thermostat during heat-up and comfort (cycle on). The circuitry accomplishes these ends by partial multiplexing of lines 134a and 134b, i.e., time-sharing the lines between the respective thermostats, in accordance with diverse voltage levels. Thus, day thermostat unit 136 is isolated from control of lines 134a and 134b when circuit voltages are such that the breakdown level of the series circuit of BL1 and BL2 is not reached. Night thermostat unit 138 is otherwise in control of lines 134a and 134b. These ends are provided for by resistor R44, which is connected in the FIG. 12 circuit only during periods in which it is desired to have the night thermostat exercise exclusive influence. With R44 in the circuit, the required voltage level to render BL1 and BL2 conductive is not attained and TR1 is not fired. TR2 fires on reaching the night thermostat level setting. A transformer secondary (not shown) in series with solenoid S provides working voltage.

Considering relay CR3 (night shutdown) to be energized, contacts CR3-1 are closed and connect R44 therethrough and through the normally closed contacts CR4-1 of CR4 to line 134a. During heat-up and comfort (cycle-on), CR3 is unenergized and CR4 is energized thereby interrupting continuity between R44 and line 134a. In either case, contacts CR3-2 or CR4-2 connect the TR3 to the junction of resistors R43 and R44 to enable the firing of TR3.

Suitable components and circuit parameters for the foregoing systems are indicated in Table 1 below. Transistors Q1–Q3 are preferably type 2N3391, Q4–Q7 preferably type 2N3638, diodes type 1N914 and the light-emitting diodes type 5082-4850. Triacs are preferably type 40525 RCA and the bi-level switches type 2N4992. Gates 92 through 122 are formed from parts Nos. SN7400N and SN7402N, products available from National Semiconductor.

Table 1

| | | | | | |
|---|---|---|---|---|---|
| R1 | 4.7 | K | R29 | 7.5 | K |
| R2 | 4.7 | K | R30 | 7.5 | K |
| R3 | 4.7 | K | R31 | 7.5 | K |
| R4 | 4.7 | K | R32 | 7.5 | K |
| R5 | 10 | K | R33 | 100 | K |
| R6 | 22 | K | R34 | 100 | K |
| R7 | 4.7 | K | R35, R36' | 10 | |
| R8 | 10 | K | R36 | 10 | K |
| R9 | 4.7 | K | R37 | 100 | K |
| R10 | 4.7 | K | R38 | 100 | K |
| R11 | 10 | K | R39 | 3.3 | K |
| R11A | 390 | | R40 | 3.3 | K |
| R12 | 390 | | R41 | 10 | K |
| R13 | 390 | | R42 | 1 | K |
| R14 | 1 | K | R43 | 10 | K |
| R15 | 390 | | R44 | 2 | K |
| R16 | 1 | K | | | |
| R17 | 1 | K | | | |
| R18 | 1 | K | C1 | .01 | |
| R19 | 1 | K | C2 | .001 | |
| R20 | 1 | K | C3 | .001 | |
| R21 | 1 | K | C4 | .0001 | |
| R22 | 1 | K | C5 | .01 | |
| R23 | 1 | K | C6 | .01 | |
| R24 | 390 | | C7 | .01 | |
| R25 | 390 | | C8 | .01 | |
| R26 | 390 | | C9 | .01 | |
| R27 | 390 | | C10 | .01 | |
| R28 | 7.5 | K | C11 | .01 | |

While the foregoing discussion has concerned the control of a heat generator, the invention contemplates controlling operation of air conditioning systems by time-slotting energization thereof responsively to a day thermostat or by this practice in conjunction with a night thermostat.

By way of summary of the foregoing disclosure as reflected in the claims below, mode-heat-up driver 48b and mode-comfort driver 48a may be considered as first circuit means for generating respective first (7 AM) and second (11 PM) output signals upon occurrence of such successive times of day. Cycle period generator 78, cycle on driver 80 and cycle off driver 86 may be viewed as second circuit means for generating successive pairs of first and second output signals, each pair defining a preselected time period (15 minutes of every 21 minute period) after such 7 AM time and prior to such 11 PM time. Output logic 90 may be viewed as third circuit means for maintaining line 90a HI for 15 minutes of every successive 21 minute period following 7 AM until 11 PM and for then maintaining line 90b HI from 11 PM until 7 AM. Line 90a HI operates switching unit 126 (FIG. 11) to connect day thermostat 128 in circuit with the heat generator whereas line 90b HI provides for connection of night thermostat 130 in circuit with the heat generator. Such first circuit means may generate first (5 AM), second (7 AM) and third (11 PM) output signals in which event such third circuit means may further discontinue the line 90b HI condition at 5 AM and maintain line 90a HI from 5 AM and maintain line 90a HI from 5 AM to 7 AM and selectively HI thereafter as above discussed.

Various modifications may evidently be introduced in the described systems and apparatus without departing from the invention. Thus, while a three-mode practice has been specifically considered, the time-slot system may be changed to involve only two modes, such as by eliminating the heat-up mode. This type of system would omit, or simply not close, the switches of switch sets 44b and 46b and would omit driver 48b and circuitry of logic 90 functioning only to process the line 52 signal. Similarly, the night shutdown mode may be omitted as desired in certain applications. Thus, the particularly disclosed systems and apparatus are intended in an illustrative and not in a limiting sense. The true spirit and scope of the invention is set forth in the following claims.

What is claimed is:

1. A system for use in operating a heat generator, comprising:
   a. first circuit means for generating first and second output signals respectively upon occurrence of successive times of day;
   b. second circuit means for generating successive pairs of first and second output signals, each such signal pair defining a preselected time period following occurrence of said first circuit means first output signal and before occurrence of said first circuit means second output signal;
   c. third circuit means for generating a first output signal throughout each said preselected time period and for generating a second output signal upon occurrence of said first circuit means second output signal and thereafter until recurrence of said first circuit means first output signal;
   d. first and second temperature-sensitive switch elements; and
   e. switching means having output terminals for connection with said heat generator and settable in first state by said third circuit means first output signal for connecting said first switch element to said output terminals and settable in second state by said third circuit means second output signal for connecting said second switch element to said output terminals.

2. The invention claimed in claim 1 further including a first temperature-sensitive switch element and a series circuit including a second temperature-sensitive switch element and a voltage-breakdown element, switch means having an input terminal connected in common to said first switch element and said series circuit and settable by both said third circuit means first and second output signals to connect said input terminal to said output terminal thereof, and circuit means for applying breakdown voltage to said voltage-breakdown element during occurrence of said third circuit means first output signal.

3. The invention claimed in claim 1 wherein said first circuit means includes first and second switching units each having first switches identifying different 1 hour periods and second switches identifying different subdivisions of a 1 hour period, said switches of said first and second switching units being selectively settable respectively to define said successive times of day, said first circuit means further including coincidence circuit means connected to said first and second switching units for generating said first circuit means first and second output signals.

4. The invention claimed in claim 3 wherein said first circuit means further includes a circuit generating first signals indicative of elapsed tens of hours and second signals indicative of elapsed individual hours of each such elapsed 10 hours and a combining circuit selectively connecting said first and second signals to said first switches.

5. The invention claimed in claim 4 wherein said combining circuit comprises first diodes for applying said first signals to said first switches and second diodes for applying said second signals to said first switches.

6. The invention claimed in claim 1 wherein said second circuit means includes an elapsed time counter and circuitry for setting said counter to zero count upon occurrence of said second circuit means first and second output signals.

7. The invention claimed in claim 6 wherein said second circuit means further includes first and second switching units each having switches identifying different subdivisions of a 1 hour period, said switches of said first and second switching units being settable to define the extents of such preselected time periods.

8. The invention claimed in claim 7 wherein said elapsed time counter generates first signals indicative of elapsed tens of minutes and second signals indicative of elapsed individual minutes of each such elapsed 10 minutes, said second circuit means further including a combining circuit selectively connecting said first and second signals to said first switches of said first and second switching units.

9. A system for use in operating a heat generator, comprising:
   a. first circuit means for generating first, second and third output signals respectively upon occurrence of successive times of day;
   b. second circuit means for generating successive pairs of first and second output signals, each such signal pair defining a preselected time period following occurrence of said first circuit means second output signal and before occurrence of said first circuit means third output signal;
   c. third circuit means for generating a first output signal upon occurrence of said first circuit means first output signal and thereafter until the occurrence of said first circuit means second output signal and throughout each said preselected time period and for generating a second output signal upon occurrence of said first circuit means third output signal and thereafter until recurrence of said first circuit means first output signal;
   d. first and second temperature-sensitive switch elements; and
   e. switching means having output terminals for connection with said heat generator and settable in first state by said third circuit means first output signal for connecting said first switch element to said output terminals and settable in second state by said third circuit means second output signal for connecting said second switch element to said output terminals.

10. A system for use in operating a heat generator, comprising:
    a. first circuit means for generating first, second and third output signals respectively upon occurrence of successive times of day;
    b. second circuit means for generating successive pairs of first and second output signals, each such signal pair defining a preselected time period following occurrence of said first circuit means second output signal and before occurrence of said first circuit means third output signal;
    c. third circuit means for generating a first output signal upon occurrence of said first circuit means first output signal and thereafter until the occurrence of said first circuit means second output signal and throughout each said preselected time period and for generating a second output signal upon occurrence of said first circuit means third output signal and thereafter until recurrence of said first circuit means first output signal;

d. a first temperature-sensitive switch element;

e. a series circuit including a second temperature-sensitive switch element and a voltage-breakdown element;

f. switch means having an input terminal connected in common to said first switch element and said series circuit and settable by both said third circuit means first and second output signals to connect said input terminal to said output terminal thereof; and g. circuit means for applying breakdown voltage to said voltage-breakdown element during occurrence of said third circuit means first output signal.

11. A system for connecting the control element of a heat generator with a voltage supply for selectively energizing said control element comprising:

a. first and second temperature-sensitive switch elements connected to said supply;

b. a third switch element connected in series circuit with said first switch element and said supply;

c. means for generating a first output signal during predetermined spaced time periods and for generating a second output signal during a further time period; and d. circuit means including a fourth switch element series-connected between said second switch element and said control element and also series-connected between said third switch element and said control element and a circuit rendering said third switch element conductive during occurrence of said first output signal and for rendering said fourth switch element conductive during occurrence of both said first and second output signals.

12. The invention claimed in claim 11 wherein said third switch element is a voltage-breakdown device, said circuit applying breakdown voltage to said device during occurrence of said first output signal.

13. The invention claimed in claim 11 wherein said circuit includes a resistive element and is responsive to said second output signal for connecting said resistive element operatively in said circuit during occurrence of said second output signal.

14. A system for connecting the control element of a heat generator with a voltage supply for selectively energizing said control element comprising:

a. first and second temperature-sensitive switch elements connected to said supply;

b. means for generating a first output signal during a first time period exceeding one hour and during predetermined spaced time periods each comprising a like subdivision of one hour and generating a second output signal during a further time period;

c. means for generating a first output signal during predetermined spaced time periods and for generating a second output signal during a further time period; and d. circuit means including a fourth switch element series-connected between said second switch element and said control element and also series-connected between said third switch element and said control element and a circuit rendering said third switch element conductive during occurrence of said first output signal and for rendering said fourth switch element conductive during occurrence of both said first and second output signals.

* * * * *